April 10, 1934.  J. WEINBERGER  1,954,231
GLOWLAMP
Filed Jan. 13, 1930
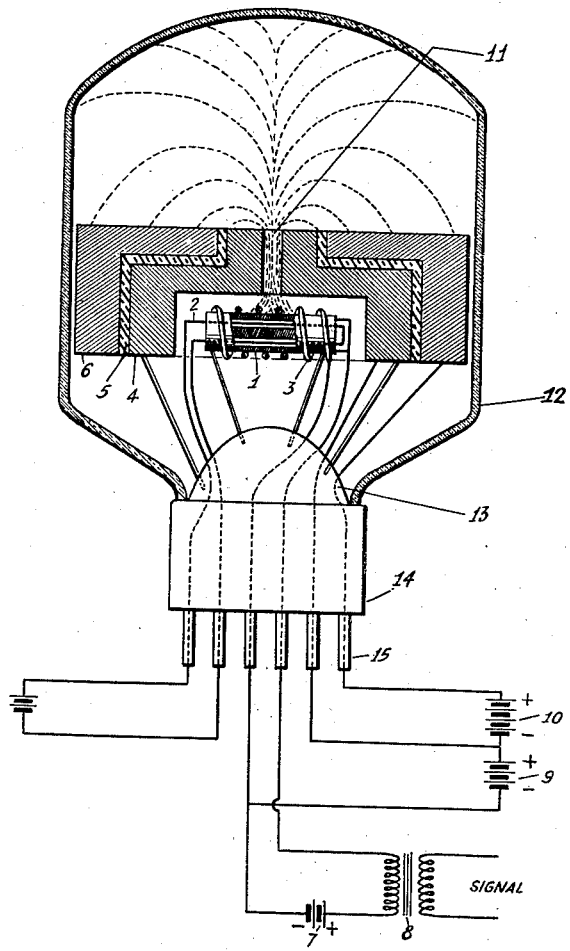
INVENTOR
JULIUS WEINBERGER
BY
ATTORNEY Patented Apr. 10, 1934

UNITED STATES PATENT OFFICE 1,954,231

GLOWLAMP

Julius Weinberger, New York, N. Y., assignor to Radio Corporation of America, a corporation of Delaware Application January 13, 1930, Serial No. 420,478

12 Claims. (Cl. 176—124)

The present invention relates to glow lamps, and, in particular, glow lamps of the type suitable for use in the reception of television or facsimile signals, and also in connection with the production of sound records in the case of talking motion picture films, wherein, for example, the so-called variable density record is made adjacent the edge of the various picture frames of the film.

According to the most common and conventional types of glow lamps now in general use, there are provided two electrode elements, one of which is known as the cathode and the other as the anode. Such a type of glow lamp is filled with gas at a suitable pressure, either low or high, depending upon the type of the lamp, the intensity of glow which is desired, the light which is desired from the lamp, and other well-known factors. All such glow lamps are filled with a gas of some sort, which is usually neon, argon, helium, or other similar inert gas, and, in many cases, in order to obtain the color of glow which is desired, it is suitable to provide a mixture of two or more gases in percentages appropriate for maintaining the desired color of glow. It is also possible to combine, where desired, the inert gas with other active gases, such as hydrogen, nitrogen, and the like.

With such lamps, when a potential is applied between the two electrodes, the well-known discharge phenomenon occurs, and this gives rise to a glow in the immediate vicinity of the cathode, which, in many cases, spreads to other parts of the tube. It is this cathode glow which has become useful in illuminating devices or glow lamps for the reception of television or facsimile signals, for the recording of sound on motion picture films, or for other and similar uses. In such cases, the glow intensity is either a function of the intensity of light and shadow on elemental areas of the transmitted television or picture subject, or is a function of the sound intensity or frequency in the case of motion picture recording signals.

Up to the present time, most of the glow tubes used have been provided with only two electrodes which gives rise to the need of a considerable amount of power for operation of the glow tube in order to produce a suitable glow discharge, and necessitates a control means for the intensity of glow by the direct variation of the potential applied between the electrodes. Other glow lamps less common, but heretofore known in the ar to which my invention relates, have been provided with a biasing grid to which a direct current potential of a value above the extinction voltage but of less value than the flash voltage has been applied. While with such lamps the signal potential necessary to produce a glow discharge is less than the potential necessary without biasing means, an arrangement is nevertheless provided in which in order to extinguish the glow it is necessary to completely short-circuit the bias medium in order to remove the bias potential, which is sufficient to maintain the glow which has once been initiated, prior to the arrival of a new signal. This requirement somewhat detracts from the utility of the latter type lamps for television and facsimile reception, as well as in sound recording on motion picture films, unless it is possible to utilize a plurality of glow lamps for producing the optical glow effects, so that certain lamps may be quenched while others remain ignited, which, of course, can be accomplished by short-circuiting the lamps in a predetermined cyclic order.

Therefore, as a primary object of my present invention, I have sought to provide a glow lamp suitable for the above named uses in which it is only necessary to use a small amount of energy in order to provide for efficient control without resorting to complicated apparatus for providing for this small amount of control energy.

A still further object of my invention is to provide a glow tube containing an electron emitting body for the purpose of ionizing the gas contained within the tube, and in combination with this electron emitting body to provide a control means for controlling the ionization of the gas due to control of the electron emission from the heated body.

Another object of my invention is to produce a glow lamp in which the initial electronic emission may be produced by the use of either an alternating or a direct current.

Still other objects of my invention are to provide in a manner to be hereinafter set forth, a glow lamp suitable for recording either voice, picture or other signals, or for illumination purposes, which is simple in its construction, which can be manufactured at a minimum expense and which provides a truer reproduction of the impressed signal than has heretofore been accomplished.

Other and further objects will, of course, become apparent and at once suggest themselves to those skilled in the art to which the invention relates by a reading of the following specification and claims in connection with the accompanying drawing, wherein the single figure thereof conventionally illustrates a glow lamp in accordance with my present invention, and appropriate external circuits suitable for operating the lamp and producing varying intensities of glow in accordance with varying impressed signals.

Briefly, the invention consists in providing a glow lamp within an evacuated envelope or chamber into which gas of appropriate type and under appropriate pressure is inserted, such that the lamp consists of the usual two-electrodes, but, in addition, preferably utilizes two other elements, of which one preferably consists of a heated body for the purpose of emitting electrons and the second consists of a grid or control electrode surrounding the heated body, by means of which the flow of electrons away from the heated body may be appropriately controlled by impressed signals.

To refer now more particularly to the drawing, the heated body 1 may consist of an insulating material coated with electron emitting oxides, and this body may be appropriately heated by means of a filament 2, through which there passes current from an external source which may be either a battery or an appropriate D. C. or A. C. heating source. According to the arrangement for heating the electron emitting surface, the construction is very similar to that employed in the well-known heated cathodes used in vacuum tubes for radio reception.

Surrounding the heated body 1 and for the purpose of controlling the electron emission therefrom, I have provided a second electrode element in the form of a spiral control grid 3. This grid may be arranged concentrically with the heated electron emitting element so that it is adapted upon the receipt of signals to control the electron emission therefrom.

Additional electrodes 4 and 6 are provided within the tube. These electrodes may be appropriately mounted within the tube in any desired manner from a stem contained therein. Through the center of the electrode element 4, I have provided a small circular or cylindrical opening 11 through which the electron stream emitted by the electron emitting element 1 is adapted to pass. The electrode 4 is surrounded by a similar electrode 6 but insulated therefrom by means of an insulating layer 5 separating the two electrodes throughout their entire surface of contact. These two electrodes 4 and 6 are constructed similarly to those employed as cathodes and anodes in the conventional "crater" type of glow lamps now used for television and facsimile transmission and reception, or sound motion picture recording, except that the electrode 4 has been hollowed out to receive the heated electron emitting element 1 and the control grid 3.

External connections are made to these various elements in the manner shown by the drawing. A battery 7 serves to bias the control grid 3 negatively through an input transformer 8. The controlling signal, for example, an incoming television signal, is applied between the control grid 3 and the electron emitting element 1 through this transformer. A battery 9 is connected between the electron emitting element 1 and the electrode 4 with its positive terminal toward the electrode 4 and the negative terminal toward the electron emitting element 1. In order to provide the electrode element 6 with a stronger positive potential than the electrode 4, I have provided an additional battery 10 connected at its positive end with the electrode 6 and at its negative end with the electrode 4.

Surrounding the entire assembly of electrodes and the associated electron emitting element and control grid, I have provided an envelope 12, and within this envelope have placed a suitable gas of appropriate type to produce the color glow which I desire. The electrode elements are appropriately mounted within the envelope 12 by means of a stem 13 which is attached to the base member 14 in the usual manner, and from the bottom of the base member 14 a series of contact terminals or prongs 15 extends. To these terminals or prongs 15, of which there are six in number, I have connected the various electrodes contained within the tube so as to provide contacts therefor in any appropriate type of tube socket adapted to hold the glow lamp.

The operation of the device is as follows:

The heated body 1 emits electrons which are permitted to pass through the control electrode or grid 3, which is in turn controlled by the incoming signal voltage representing any desired type of signal. The positive charge on the electrode 4, provided by the battery 9, draws the electrons toward this chamber when they are allowed to pass through the grid by the signal. Within the cylindrical opening 11 of this chamber, there is set up an additional accelerating field, because of the positive charge on the electrode 6 provided by the battery 10, so that the electrons which are drawn toward the electrode 4 are accelerated and tend to spurt through the hole or opening 11 with increased velocity, as is represented by the dotted lines on the drawing, indicating the electron path through the cylindrical opening 11. The velocity of the electron flow through the cylindrical opening 11 and emitted therebeyond reaches a sufficient value to produce ionization of the gas within its region due to collision, as is well known, and sets up within the opening 11 a strong glow which may be observed by looking at the end of the tube in the direction shown by the arrow. This corresponds to the normal cathode glow of the well-known two-electrode device, but is found to be of much greater intensity because of the copious electron emission from the heated body, and is more easily and efficiently controllable by virtue of the control electrode 3 controlled in turn by incoming signals impressed by way of the transformer 8.

In some cases it is possible to dispense with the control grid and apply incoming signals to the lamps in the usual manner. Also, it should be understood that the electrode shaping and general arrangement need not be exactly as shown, since, for example, the cylindrical opening 11 may be considerably longer; the control grid 3 may be in the form of a mesh interposed between the electron emitter and the electrodes 4 and 6; the electrodes 4 and 6 need not be of such great transverse thickness as shown by the drawing; the electron emitter may be arranged longitudinally of the opening 11; the electrode 6 may even serve as the lower portion of the evacuated gas filled envelope; the electrode 6 may be omitted; or other similar and like changes may be made in the arrangement.

Therefore, while I have illustrated and described my invention in only one of its preferred embodiments, it is, of course, apparent that I may make many modifications and changes therein. Therefore, I believe myself to be entitled to make any and all modifications such as fall fairly within the spirit and scope of the invention as defined by the hereinafter appended claims.

Having now described my invention, what I claim and desire to secure by Letters Patent is the following:

1. In a glow lamp, a gas-filled envelope housing a pair of cold electrodes, a layer of insulating material separating said electrodes from each other, a heated body serving as a source of electrons, a grid electrode interposed between said heated body and one of said cold electrodes, means for applying potentials of different strengths to said cold electrodes, and means provided by said control grid for controlling the electron emission from said heated electrode.

2. In combination with a glow lamp having a gas-filled envelope for housing a plurality of cold electrodes, an electron emitting element, and a control grid for controlling the intensity of glow produced within said gas-filled envelope, means for applying positive potential values to said cold electrodes relative to said electron emitting element, means for applying a heating current to said electron emitting element, and means for applying signal potentials between said control grid and said electron emitter for producing glow discharges proportional to incoming signals.

3. In a glow lamp, a gas-filled envelope housing a pair of annular concentrically positioned cold electrodes insulated from each other, an electrode serving as a source of electrons, means for indirectly heating said last named electrode to produce electron emission therefrom, a grid electrode interposed between said heated body and one of said cold electrodes, means for applying positive potentials of different strengths to said cold electrodes relative to said heated body, and means provided by said control grid for controlling the electron emission from said heated electrode.

4. In a glow lamp construction, a gas-filled envelope housing a heated electron emitting element, a second electrode element having a cylindrical opening therethrough and cooperating with the electron emitting element by providing a passage through which the electrons emitted from said heated body are adapted to concentrate, and a control electrode interposed between said electron emitting element and the opening in said second electrode element for controlling the intensity of the electron stream flowing from said first named electrode element through said opening in said second electrode element.

5. A glow lamp comprising a plurality of adjacent cold electrodes, a layer of insulating material separating said cold electrodes for insulating one with respect to the other, a heated electron emitting source arranged to cooperate with said cold electrodes for producing a glow discharge between said cold electrodes and said source, and a control electrode interposed between said electron source and said cold electrodes for controlling the intensity of the glow produced.

6. A glow lamp comprising a plurality of cold electrodes, a layer of insulating material separating said electrodes for insulating one with respect to the other, an indirectly heated electron emitting source arranged to cooperate with said cold electrodes for producing a glow discharge between said cold electrodes and said source, and a control electrode interposed between said electron source and said cold electrodes for controlling the intensity of the glow discharge produced.

7. In a glow lamp, a first cold electrode, a second cold electrode surrounding a portion of said first electrode, insulating material between said first and second electrodes for electrically insulating adjacent surfaces thereof, a source of electrons for cooperating with said first named electrodes to produce a glow discharge within said lamp upon the application of an electric potential difference between said electrodes and said source, and a control electrode in the path of the electron flow between said source of electrons and said first and second electrodes for regulating the intensity of the glow discharge produced between said electrodes.

8. In a glow lamp, a first cold electrode, a second cold electrode surrounding a portion of said first electrode, insulating material between said first and second electrodes for electrically insulating adjacent surfaces thereof, a source of electrons for cooperating with said first named electrodes to produce a glow discharge within said lamp upon the application of electric potentials to said electrodes, a control electrode in the path of the electron flow between said source of electrons and said first and second electrodes for regulating the intensity of the glow discharge produced between said electrodes, and a gas filled envelope housing all of said electrodes.

9. In a glow lamp, a first cold electrode having a central aperture therethrough, a second cold electrode surrounding substantially the entire of said first electrode, a layer of insulating material separating said electrodes electrically one from the other, means for applying positive potentials of different values to each of said electrodes, a source of electrons arranged substantially concentrically of said central aperture within said first electrode and adapted to produce upon the application of a potential difference between said first electrode and said source of glow discharge, and a controlling electrode surrounding said source of electrons for varying upon the application of signal potentials thereto the intensity of the glow discharge produced.

10. In a glow lamp, a first cold electrode having a central aperture therethrough and being recessed throughout a portion of one surface thereof, a second cold electrode surrounding substantially the entire of said first electrode, a layer of insulating material separating said electrodes electrically one from the other, means for applying positive potentials of different values to each of said electrodes, a source of electrons arranged within said recessed portion of said first electrode and substantially concentrically of said central aperture for producing upon the application of a potential difference between said first electrode and said source a glow discharge, and a controlling electrode surrounding said source of electrons for varying upon the application of signal potentials thereto the intensity of the glow discharge produced.

11. A glow discharge device comprising an envelope, a cathode, a plurality of annular concentrically positioned anodes arranged within the envelope so as to define the path of glow discharge, a discharge controlling electrode located intermediate the cathode and the anode members, and means for supplying different potentials to the anode with respect to the cathodes to control the discharge path.

12. An electron discharge device comprising a first annular cold electrode, a second annular cold electrode surrounding the periphery of the first cold electrode, a layer of insulating material separating adjacent surfaces of the first and second annular electrodes, an electron source, means for applying positive voltage of different values relative to the source to the tube electrodes to produce an electronic discharge between the source and the electrodes, a control electrode interposed in the path of the electronic discharge for regulating the intensity thereof, and an envelope for enclosing all of the electrode members and for maintaining a cooperative atmosphere therefor.

JULIUS WEINBERGER.